March 29, 1932. O. HÜRLIMANN 1,851,251
DEVICE FOR DISTRIBUTING AIR OR GASES IN FLUIDS
Filed March 11, 1931
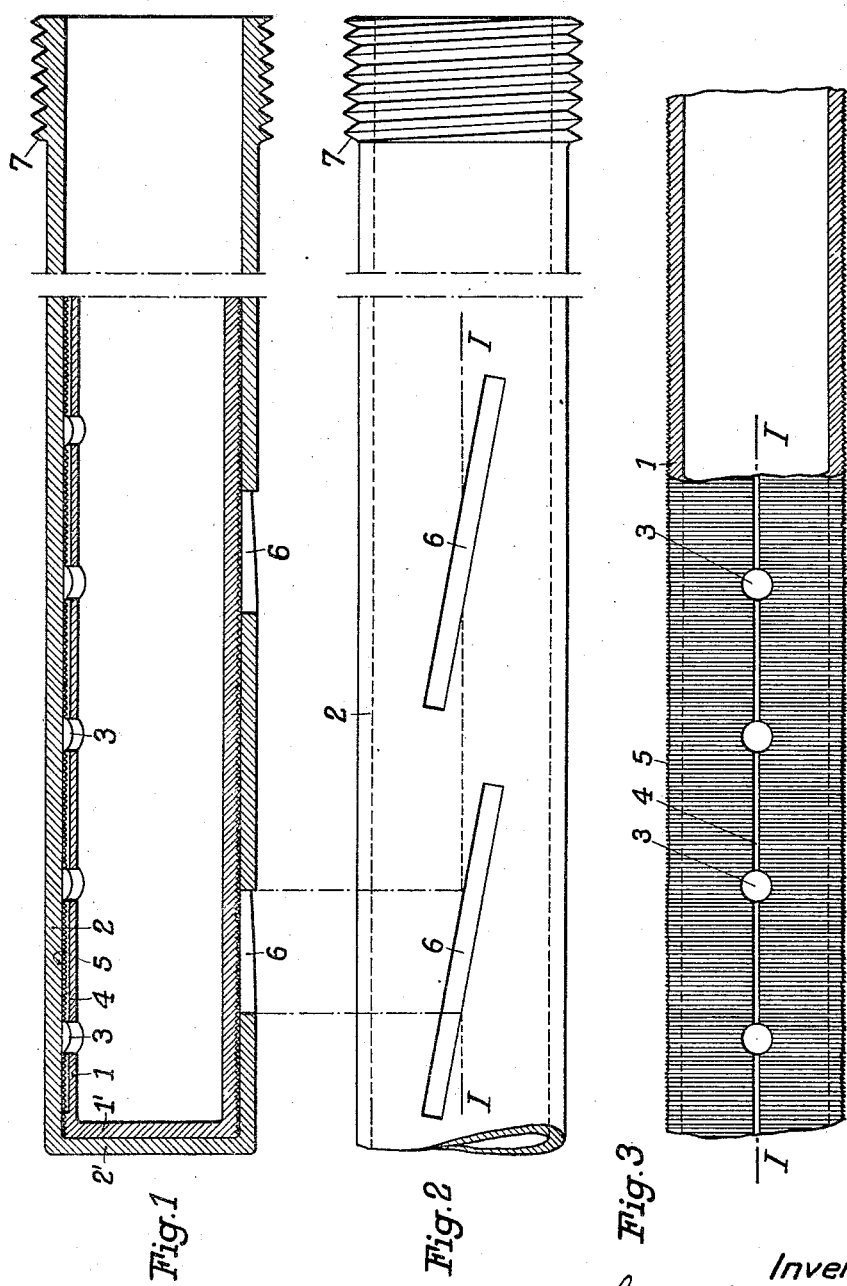
Inventor:
Oskar Hürlimann
By B. Singer, Atty.

Patented Mar. 29, 1932

1,851,251

UNITED STATES PATENT OFFICE

OSKAR HÜRLIMANN, OF MUNICH, GERMANY

DEVICE FOR DISTRIBUTING AIR OR GASES IN FLUIDS

Application filed March 11, 1931, Serial No. 521,817, and in Germany September 30, 1930.

The present invention relates to devices for distributing carbon dioxide, air and other gaseous substances in water or other fluids in the form of minute gas bubbles, for instance in order to aerate water or for bathing purposes.

The hitherto known devices of this kind comprise an inner air supply tube, which is equipped with perforations for the distribution of the air, an outer likewise perforated outlet tube spaced from the inner one and surrounding same, and a porous mass, which for instance may consist of fibrous matter and fills the space between the inner and the outer tube, thereby effecting a fine distribution of the air delivered from the inner tube, so that the air will escape from the outer tube and enter the fluid in the form of minute bubbles.

Devices of this kind are technically complicated and not as effective as might be desired, because it is very difficult to maintain the filler body between the inner and the outer tube in a state of uniform density. This difficulty is of course enhanced, when the device is permanently used and the filler mass is moistened through the fluid.

According to the present invention the above named drawbacks are avoided by arranging the inner and the outer tube coaxially in such a manner, that the inner tube fits in the outer one and the intermediate space as well as the filler mass are dispensed with. The inner tube is equipped with perforations through which the gas or air will escape and the outer tube is also equipped with perforations or slots the positions of which relative to the perforations of the inner tube may be adjusted after desire.

In order that the air escaping from the inner tube may enter the perforations or slots in the outer tube in finely subdivided state, very fine rifles or grooves are formed in the outer surfaces of the inner tube or the inner surface of the outer tube or in both surfaces. Such rifles may for instance consit of densely spaced circular grooves or of continuous spiral grooves. In order to effect an even distribution of the air escaping from the inner tube the outer surface of this tube may be formed with one or more narrow longitudinal grooves running parallelly to the length axis of the tube and interconnecting the perforations in the same. Experiments have shown, that a device of this kind will effect a very fine and uniform distribution of air and gases in the form of small bubbles over the entire length of the system, without the state of the fluid being changed thereby. When the above described device is used a distribution is obtained, which is just as thorough as that obtained by means of a filler mass arranged between the tubes and the drawbacks adhering to this mass are avoided.

A constructional form of the invention is shown by way of example in the accompanying drawings.

Fig. 1 is a longitudinal sectional view taken on the line I—I in Figs. 2 and 3 and showing both tubes in operative position.

Fig. 2 shows the outer tube and the slots formed therein.

Fig. 3 is a partially sectional view, showing the inner tube of the device.

1 denotes the inner tube which fits in the outer tube 2. The bottom 1' of the inner tube 1 contacts with the bottom 2' of the outer tube 2. The inner tube 1 is formed with apertures 3, which are interconnected by means of grooves 4 through which the air escaping from the apertures 3 will flow in the form of a band. The outer tube 2 is also formed with apertures or slots 6. These slots are preferably arranged in such a manner, that they form an angle with the longitudinal axis of the tube. By rotating the tubes in relation to each other, the slots in the outer tube may be brought into communication with different apertures in the inner tube 1. The exterior surface of the inner tube or the interior surface of the outer tube or both these surfaces are formed with very fine grooves or rifles having a width of fractions of a millimeter. Said grooves or rifles may for instance be formed as tightly spaced circles or as a continuous spiral line. The air will leave the grooves and enter the slots 6 in the outer tube in the form of minute bubbles which are uniformly distributed in the surrounding fluid.

The outer tube is at its open end preferably equipped with a thread 7 by means of which the apparatus may be connected to a nipple or the like, which communicates with a source of air or gas.

If desired a plurality of devices may be arranged in parallel relation and be connected to a common source of gas or air.

When the exterior surface of the inner tube and the interior surface of the outer tube are grooved the cross-sectional area of the air channels and the size of the air bubbles may be changed simply by rotating the inner tube about a small angle in relation to the outer tube.

It will be understood, that the described device is capable of considerable modification without departure from the spirit of the invention and the scope of the claims.

I claim:—

1. A device for distributing air, gases and the like in fluids, comprising an outer tube, inclinedly arranged slots in said tube, an inner perforated tube, longitudinally running relatively shallow grooves interconnecting the perforations in the inner tube and a system of fine grooves distributed over the exterior surface of the inner tube and adapted to communicate with the perforations in the inner tube and the slots in the outer tube.

2. A device for distributing air, gases and the like in fluids, comprising an outer tube, inclinedly arranged slots in said tube, an inner perforated tube, longitudinally running relatively shallow grooves interconnecting the perforations in the inner tube and a system of fine grooves distributed over the interior surface of the outer tube and adapted to communicate with the perforations in the inner tube and the slots in the outer tube.

3. A device for distributing air, gases and the like in fluids, comprising an outer tube, inclinedly arranged slots in said tube, an inner perforated tube, longitudinally running relatively shallow grooves interconnecting the perforations in the inner tube and a system of fine grooves distributed over the exterior surface of the inner tube and the interior surface of the outer tube and adapted to communicate with the perforations in the inner tube and the slots in the outer tube.

4. Device for dispersing air or gas in the form of fine bubbles or beads, comprising two tightly interfitted tubes of which the inner one serves for conducting that air which is to be dispersed in the form of bubbles, said tube being provided with slits or openings circumferentially staggered for the discharge of the air and there being provided between the inner surface of the outer tube and the outer surface of the inner tube extremely fine circular or spiral grooves, whereby the air leaving the openings in the inner tube is conducted to the staggered openings in the jacket of the outer tube in the form of very fine, uniformly distributed beads or bubbles.

In testimony whereof I have affixed my signature.

OSKAR HÜRLIMANN.